Nov. 17, 1959
A. OSSENBRUNNER ET AL
2,913,351
PHOTOGRAPHIC FILTER LAYERS
Filed Nov. 14, 1956
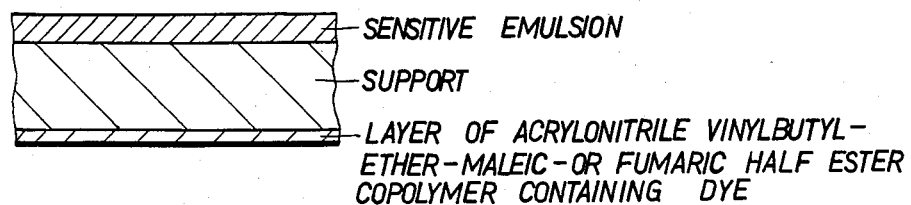
INVENTORS:
ARMIN OSSENBRUNNER, HELFRIED KLOCKGETHER, WERNER STARCK,
WERNER LANGBEIN,
BY
Connolly and Hutz
Their ATTORNEYS

2,913,351
PHOTOGRAPHIC FILTER LAYERS

Armin Ossenbrunner and Helfried Klockgether, Leverkusen, and Werner Starck, Hofheim (Taunus), and Werner Langbein, Lorsbach (Taunus), Germany, assignors of one-half to AGFA Aktiengesellschaft, Leverkusen, Germany, a corporation of Germany, and one-half to Farbwerke Hoechst Aktiengesellschaft, Frankfurt (Main), Germany, a corporation of Germany Application November 14, 1956, Serial No. 622,088

Claims priority, application Germany November 26, 1955

2 Claims. (Cl. 117—33.3)

This invention relates to photographic antihalation and filter layers, the binding agent of which at least partially consists of copolymers of acrylonitrile, vinylbutylether and maleic or fumaric semi-esters.

It is known to provide photographic materials such as black and white films and multi-layer color films with an anti-halation layer in order to avoid halation. This latter layer is either interposed between the layer support and the silver halide emulsion layer or is applied to the back of the support. The antihalation layer generally consists of an antihalo dyestuff which can be bleached out and which is soluble in alkaline developers, and a film-forming support, generally gelatine, or on account of their better mechanical properties, alkali-soluble plastics. As examples of these latter, the following have already been proposed:

Copolymers of styrene-acrylic acid, vinyl isobutyl ether-maleic acid, vinyl butyl ether-maleic acid and styrene-maleic acid, according to U.S. Patents 2,075,145, 2,089,764, and 2,282,890.

Cellulose acetate phthalates according to U.S. Patent 1,954,377.

Polyvinyl phthalates according to U.S. Patent 2,131,747.

In actual fact, however, the standards required of an anti-halation layer are so high that only a few of the products mentioned above are suitable for practical use in manufacture. In the selection of a suitable synthetic resin, the following points have to be considered:

(1) Sufficient solubility in organic solvents which are at the same time suitable for the antihalo dyestuff, and these solvents should cause only slight or no initial swelling of the layer support, since otherwise this becomes dyed.

(2) Sufficient solubility in the developers, which are frequently only weakly alkaline, so that no residues are left after the treatment in the photographic bath.

(3) Lowest possible tendency to transfer on to the emulsion layer which is disposed in contact with the antihalation layer. This transfer makes the film material unsuitable for use.

These last two requirements can only be met with difficulty. If in each molecule the number of those groups which produce alkali-solubility is increased, the solubility in the alkaline developers is improved but the resistance to transfer is reduced due to the increase in hydrophilic properties, while on the other hand a reduction of the number of groups causing solubility in alkalies improves the resistance to transfer, but reduces the solubility in the photographic baths.

It has now been found that alkali-soluble copolymers of acrylonitrile, vinyl butyl ether and maleic or fumaric acid semi-esters are able to meet the high demands referred to above and are therefore very suitable as carriers for antihalation dyestuffs. Suitable maleic or fumaric acid semi-esters are methyl and ethyl semi-esters. Semi-esters of maleic acid or fumaric acid with higher alcohols are less suitable, since experience has shown that these semi-esters do not impart in all cases a sufficient degree of alkali-solubility to the product.

Optimum properties are obtained within strict limits in the composition of the copolymers. In order to produce a sufficient degree of solubility in the alkaline developers, the percentage of the maleic or fumaric acid semi-esters must be approximately 40–60 molar percent of the molecule. The molar ratio between the acrylonitrile and vinyl butyl ether is preferably such that the vinyl butyl ether is present in major proportion. A molar ratio of 1:4 has been found to be especially suitable. A lowering of the proportion of acrylonitrile increases the tendency of the layer to transfer to the emulsion, while an increase in this proportion reduces the solubility in those solvents which usually are also suitable for the antihalo dyestuffs.

The products preferably have a medium degree of viscosity, corresponding to 2–100, preferably 5–30 centipoise of a 5 percent ethanolic solution of the copolymer (measured in a Hoeppler viscosimeter). A substantial lowering of the molecular weight impairs the film-forming properties of the resin, while a substantial increase reduces the solubility in the alkaline developers and makes difficult the thorough drying of the layer.

The products are prepared from their components by one of the conventional polymerisation processes. They can also be contained by copolymerising the vinyl components with maleic anhydride in acetone or any other inert solvent and subsequently boiling the product with that amount of, for instance, methanol or ethanol which is calculated for the formation of a semi-ester.

The drawing shows a diagrammatic representation of a support coated on one side with a sensitive emulsion and on the opposite side with a layer of acrylonitrile vinylbutyl ether maleic or fumaric half ester copolymer containing a dye.

The following examples further illustrate the invention.

Example 1

8 g. of the antihalo dyestuff of the formula:

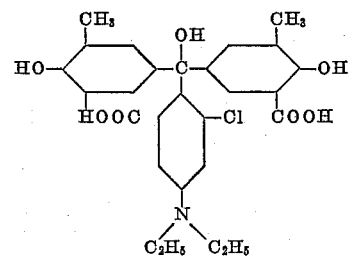

and 12 g. of a 25 percent solution of a copolymer of 4 mols of vinyl butyl ether, 1 mol of acrylonitrile and 5 mols of maleic acid ethyl semi-ester are dissolved in the following solvent mixture: 70 parts of ethanol, 20 parts of ethyl acetate, 10 parts of butanol.

The solution is applied by dipping to the back of an acetyl cellulose film and dried at approximately 80° C. by blowing air thereon. The layer support thereafter has a silver halide emulsion cast on to its front surface.

The layer dissolves satisfactorily when processed in the photographic baths and does not transfer on to the emulsion layer under the conditions which prevail in practice, even with long storage.

A homogeneous mixture is prepared from 78.6 parts of maleic acid anhydride
63 parts of vinyl butyl ether
8 parts of acrylonitrile
0.15 part of benzyl peroxide in
200 parts of methyl acetate 20% of the mixture thus obtained is placed in an enamelled vessel which is equipped with a reflux condenser, stirring equipment and a heating system, and heated to the boil with stirring. After the polymerisation has set in, which becomes apparent from the contents of the vessel becoming viscous, the remaining 80% of the mixture of the monomers are run in with further heating within 4 hours. After another two hours polymerisation is complete. Thereupon 175 parts of ethanol are added and the mixture is refluxed for a further 5 hours.

The methyl acetate is then distilled off on the decending condenser until the inside temperature has reached 75° C.

The concentrated solution of the mono-ethyl ester of the copolymer is adjusted to a content of solids of 25% by addition of ethanol while cooling.

*Example 2*

6 g. of the antihalo dyestuff of Example 1,
10 g. of the 25 percent copolymer solution of Example 1, are dissolved in the following solvent mixture:

60 parts of ethanol,
10 parts of ethyl acetate,
30 parts of isopropanol.

This solution is applied in the same way as in Example 1. The properties of the antihalation layer obtained are similar.

As regards the dyestuffs which are incorporated into the antihalation layer there may be used any dyestuffs suitable for this purpose, it being desirable that they are alcohol-soluble. Of special interest are the dyestuffs of Belgian Patent 542,750.

We claim:

1. A photographic element comprising in combination a photographic support and a light absorbing layer coated on said support, said layer containing as a binding agent a copolymer consisting essentially of acrylonitrile, vinylbutyl ether and a semi-ester selected from the group consisting of maleic and fumaric semi-esters of a lower saturated aliphatic monohydric alcohol selected from the group consisting of methanol and ethanol, the vinylbutyl ether being present in a major proportion with respect to the acrylonitrile present, said semi-ester being incorporated in said copolymer in an amount of 40–60 mol percent as calculated on the total amount of monomers to impart to said copolymer solubility in alkaline silver halide developing solutions.

2. A photographic element as claimed in claim 1, wherein the copolymer contains the vinylbutylether and the acrylonitrile in a molar proportion of about 4:1.

References Cited in the file of this patent
UNITED STATES PATENTS

| | | |
|---|---|---|
| 2,282,890 | Schneider | May 12, 1942 |
| 2,436,204 | D'Alelio | Feb. 17, 1948 |
| 2,694,698 | Grosser | Nov. 16, 1954 |